(12) United States Patent
Jayaram et al.

(10) Patent No.: US 11,615,540 B2
(45) Date of Patent: Mar. 28, 2023

(54) METHODS AND SYSTEMS TO TRACK A MOVING SPORTS OBJECT TRAJECTORY IN 3D USING A SINGLE CAMERA

(71) Applicant: MAIDEN AI, INC., Seattle, WA (US)

(72) Inventors: Vivek Jayaram, Seattle, WA (US);
Arjun Verma, Seattle, WA (US);
Brogan McPartland, Seattle, WA (US);
Vaikkunth Mugunthan, Cambridge, MA (US)

(73) Assignee: MAIDEN AI, INC., Seattle, WA (US)

( * ) Notice: Subject to any disclaimer, the term of this patent is extended or adjusted under 35 U.S.C. 154(b) by 0 days.

(21) Appl. No.: 17/730,865

(22) Filed: Apr. 27, 2022

(65) Prior Publication Data

US 2022/0343514 A1 Oct. 27, 2022

Related U.S. Application Data

(60) Provisional application No. 63/180,228, filed on Apr. 27, 2021.

(51) Int. Cl.
*G06T 7/246* (2017.01)
*G06T 11/20* (2006.01)
(Continued)

(52) U.S. Cl.
CPC .......... *G06T 7/251* (2017.01); *A63B 24/0021* (2013.01); *A63B 71/0622* (2013.01);
(Continued)

(58) Field of Classification Search
CPC ........ A63B 24/0021; A63B 2024/0031; A63B 2024/0034; A63B 71/0622;
(Continued)

(56) References Cited

U.S. PATENT DOCUMENTS 9,036,864 B2   5/2015   Johnson et al.
9,094,615 B2   7/2015   Aman et al.
(Continued)

FOREIGN PATENT DOCUMENTS

CN    111866575 A    10/2020
EP      3798978 A1    3/2021
(Continued)

OTHER PUBLICATIONS

Chen et al. "Physics-based ball tracking and 3D trajectory reconstruction with applications to shooting location estimation in basketball video." Journal of Visual Communication and Image Representation 20.3 (2009): 204-216. (Year: 2009).*

(Continued)

*Primary Examiner* — Katrina R Fujita
(74) *Attorney, Agent, or Firm* — Davis Wright Tremaine LLP

(57) ABSTRACT

Systems and methods are described for generating a three-dimensional track a ball in a gaming environment from a single camera. In some examples, an input video including frames of a ball moving in a gaming environment recorded by a camera may be obtained, along with a camera projection matrix associated with at least one frame that maps a two-dimensional pixel space representation to a three-dimensional representation of the gaming environment. Candidate two-dimensional image locations of the ball across the plurality of frames may be identified using a neural network or a computer vision algorithm. An optimization algorithm may be performed that uses a 3D ball physics model, the camera projection matrix and a subset of the candidate two-dimensional image locations of the ball to generate a three-dimensional track of the ball in the gaming environment. The three-dimensional track of the ball may then be provided to a user device.

20 Claims, 11 Drawing Sheets

(51) Int. Cl.
*A63B 71/06* (2006.01)
*A63B 24/00* (2006.01)
*A63B 102/20* (2015.01)
*A63B 102/18* (2015.01)

(52) U.S. Cl.
CPC ............ *G06T 7/248* (2017.01); *G06T 11/203* (2013.01); *A63B 2024/0031* (2013.01); *A63B 2024/0034* (2013.01); *A63B 2071/0636* (2013.01); *A63B 2102/18* (2015.10); *A63B 2102/20* (2015.10); *A63B 2220/05* (2013.01); *A63B 2220/806* (2013.01); *A63B 2243/007* (2013.01); *A63B 2243/0025* (2013.01); *A63B 2243/0037* (2013.01); *G06T 2207/10016* (2013.01); *G06T 2207/20084* (2013.01); *G06T 2207/30224* (2013.01); *G06T 2207/30241* (2013.01)

(58) Field of Classification Search
CPC ........ A63B 2071/0636; A63B 2102/18; A63B 2102/20; A63B 2220/05; A63B 2220/806; A63B 2243/0025; A63B 2243/0037; A63B 2243/007; G06T 7/248; G06T 7/251; G06T 11/203; G06T 2207/10016; G06T 2207/20084; G06T 2207/30224; G06T 2207/30241
See application file for complete search history.

(56) References Cited

U.S. PATENT DOCUMENTS

| | | | | |
|---|---|---|---|---|
| 10,489,656 | B2* | 11/2019 | Lee | ............... G06V 10/25 |
| 11,045,705 | B2* | 6/2021 | Zhang | ............... G06T 7/207 |
| 11,157,742 | B2* | 10/2021 | Zhang | ............... G06N 3/08 |
| 2010/0123830 | A1 | 5/2010 | Vunic | |
| 2013/0039538 | A1 | 2/2013 | Johnson et al. | |
| 2015/0260512 | A1* | 9/2015 | Greiner | ............... G06T 7/20 |
| | | | | 702/150 |
| 2017/0256066 | A1* | 9/2017 | Richard | ............... H04L 67/04 |
| 2018/0322671 | A1 | 11/2018 | Song | |
| 2019/0147219 | A1* | 5/2019 | Thornbrue | ............... G06T 7/254 |
| | | | | 348/169 |
| 2020/0298080 | A1 | 9/2020 | Zhang | |
| 2020/0368616 | A1 | 11/2020 | Delamont | |
| 2022/0138969 | A1* | 5/2022 | Forsgren | ............... G06V 20/52 |
| | | | | 382/103 |

FOREIGN PATENT DOCUMENTS

| | | |
|---|---|---|
| WO | 2007035878 A2 | 3/2007 |
| WO | 2020033612 A1 | 2/2020 |
| WO | 2021119462 A1 | 6/2021 |

OTHER PUBLICATIONS

Chen, Hua-Tsung. "Geometry-based camera calibration using five-point correspondences from a single image." IEEE Transactions on Circuits and systems for Video Technology 27.12 (2016): 2555-2566. (Year: 2016).*

Chen et al. "Ball tracking and 3D trajectory approximation with applications to tactics analysis from single-camera volleyball sequences." Multimedia Tools and Applications 60.3 (2012): 641-667. (Year: 2012).*

Gomez-Gonzalez, et al. "Reliable real-time ball tracking for robot table tennis." Robotics 8.4 (2019): 90. (Year: 2918).*

Kamble et al. "Ball tracking in sports: a survey." Artificial Intelligence Review 52.3 (2019): 1655-1705. (Year: 2019).*

Parisot, et al. "Consensus-based trajectory estimation for ball detection in calibrated cameras systems." Journal of Real-Time Image Processing 16.5 (2019): 1335-1350. (Year: 2019).*

International Search Report and Written Opinion dated Aug. 19, 2022, Patent Application No. PCT/US2022/026579, 12 pages.

International Search Report and Written Opinion dated Aug. 5, 2022, Patent Application No. PCT/US2022/026575, 10 pages.

Wu et al., 'Multi-camera 3D ball tracking framework for sports video', IET Image Processing, 2020, vol. 14, No. 15, [retrieved onSep. 20, 2022], Retrieved from: <URL: https://ietresearch.onlinelibrary.wiley.com/doi/10.1049/iet-ipr.2020.0757>. Feb. 11, 2021, 11 pages.

International Search Report and Written Opinion dated Jan. 17, 2023, Patent Application No. PCT/US2022/076975, 9 pages.

* cited by examiner

METHODS AND SYSTEMS TO TRACK A MOVING SPORTS OBJECT TRAJECTORY IN 3D USING A SINGLE CAMERA

CROSS-REFERENCE TO RELATED APPLICATIONS

This application claims the benefit of U.S. Provisional Patent Application No. 63/180,228, filed Apr. 27, 2021, the disclosure of which is incorporated herein by reference in its entirety.

BACKGROUND

Over the last two decades, 3D ball tracking has rapidly grown in popularity at the highest levels of professional sport. Some examples of this include the use of Hawkeye Innovations technology or VirtualEye technology for reviews at international-level cricket tournaments and at tennis grand slams. Today, 3D ball tracking is widely used across sports for decision reviews, viewer engagement, and automatic data collection. While average people who play sport, and even professionals who are not playing in the biggest tournaments, do not expect to play in an environment where such technology is enabled, the ability to track the ball in 3D and receive the analytics derived from it has become deeply associated with the viewing and analysis of the highest levels of professional sport. Data collected from the operation of these technologies is also used by players, teams, coaches and analysts for performance improvement, as well as by commentators and broadcasters to display interesting insights, thereby further engaging audiences. The reason for the inaccessibility of such technologies at larger scale relates to their exorbitantly high prices, as well as complicated maintenance, installation and operational requirements. Often, these technologies require multiple (e.g., 6-10) high speed cameras operating at high frames per second (e.g., 340 fps), optic fiber cables connecting these cameras to a central hub and a number of operators ensuring accuracy and smooth operation. The plurality of cameras allow for triangulation of the ball position at a specific moment, and the optic fiber cables allow for the cameras to be time synced with very small margin, which makes triangulation more accurate. Such extensive hardware and manual involvement are crucial to keep the tracking within the margin for error that is permitted at the highest level of sport (for instance, the International Tennis Federation requires less than 5 mm accuracy and Hawkeye claims to deliver average accuracy within 2.6 mm). The broad market has much to gain from similar technology, even at lower accuracy, by using the derived data for performance improvement, scouting, social media sharing, etc. However, the financial installation, maintenance and operational obstacles of such technologies make them inaccessible. Easier-to-operate, lower-cost solutions, with lower accuracy, have been created for the broader market (e.g., https://playsight.com/), but these also generally require multiple cameras, additional hardware and a level of investment, maintenance and operation that is often infeasible for club-level players, academies and even professionals at practice. Other solutions track the ball in 3D using the size of the ball to infer the distance from the object to the camera, but such solutions fail for small balls/objects as well as in cases with high amounts of motion and motion blur in the recording.

In view of the foregoing, a need exists for a 3D ball tracking technology that involves minimal hardware, is highly affordable, and is easy to install and maintain to overcome the aforementioned obstacles presented by current solutions.

BRIEF DESCRIPTION OF THE DRAWINGS

Various techniques will be described with reference to the drawings, in which.

DETAILED DESCRIPTION

Figure 1:
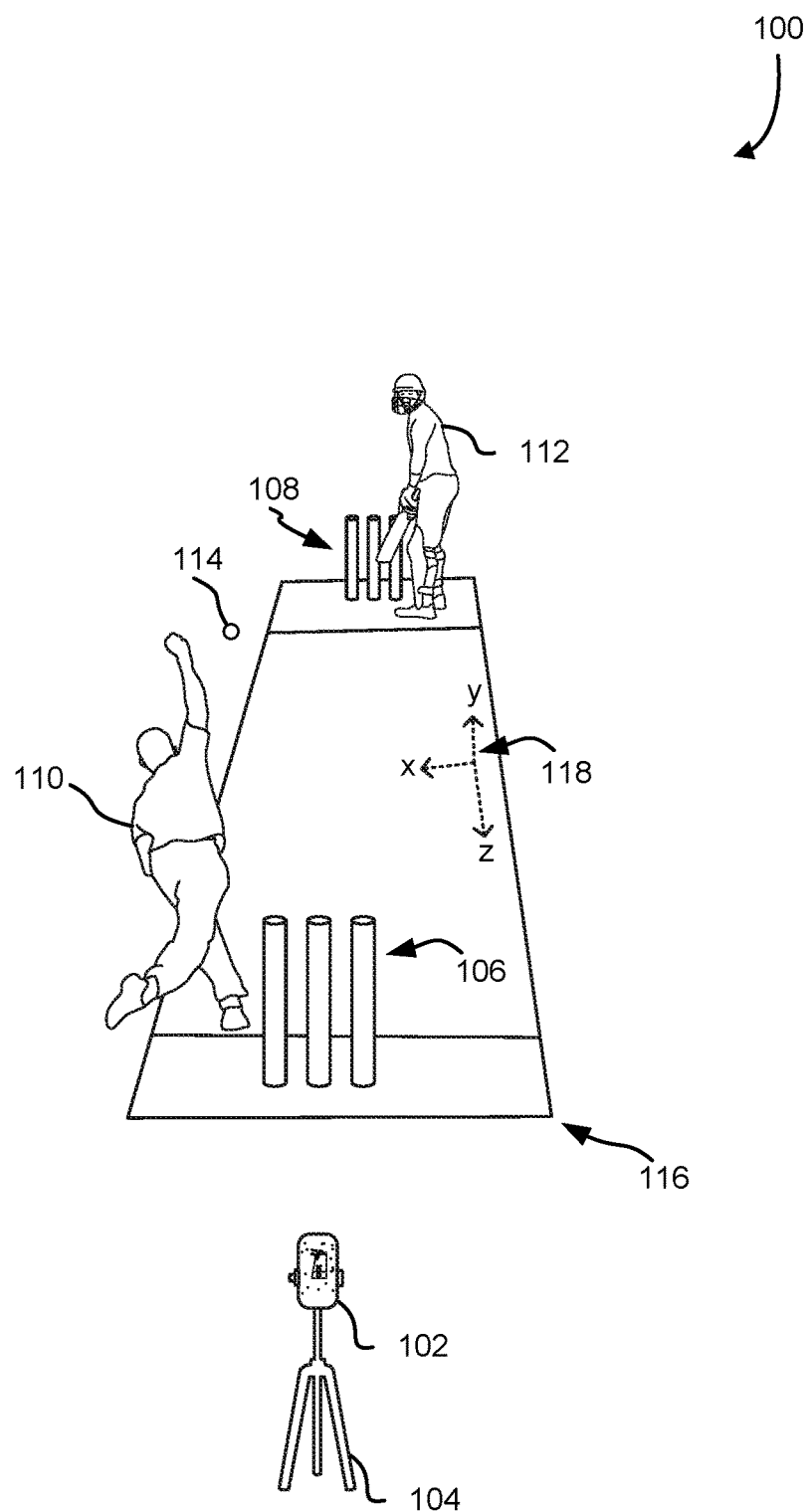
FIG. 1 illustrates an example of a device/system, in a gaming environment, to capture video and generate a 3D track and/or other metrics of a ball in the gaming environment, according to at least one embodiment.

Systems and methods are described herein for generating a track or path of a ball moving in three dimensions (3D) using a single camera, such as may be used in various gaming environments. In some aspects, 3D ball tracking systems and methods address one or more of the aforementioned problems by computing the 3D track of a ball moving in a gaming environment (e.g., at a cricket game, baseball game, football game, soccer game, basketball game and the like), where video of the gaming environment is received from a single stable camera (e.g., a smart phone, digital camera, or the like). In some cases, using various techniques, a 3D track may be fitted to a set of 2D points from a video frame and refined to conform to known physics about the characteristics of the ball in specific gaming environments.

In some examples, input video of the gaming environment may be recorded by a camera of a user device, such as one or more cameras of a smartphone. As used herein, a single camera may refer to one or more cameras that are co-located, such as one, two, or three, etc., cameras that are all part of the same camera or device but are collocated. The camera may be stable, such as on a tripod or mount, or may be moving, such as a handheld camera or attached to a moving camera operator (e.g., a camera mounted on a helmet of a player in a gaming environment). The input video may include a plurality of frames of a ball moving in a gaming environment, such as captured at a minimum of 30 frames per second (FPS), but which may also be captured at higher rate, such as 60 FPS, 90 FPS, 240 FPS, etc., with higher frame rates yielding more accurate results. In some cases, the described 3D ball track generation techniques may be utilized in connection with automatically recorded action segments in a gaming environment, as described in U.S. application Ser. No. 17/731,005, titled "METHODS AND SYSTEMS TO AUTOMATICALLY RECORD RELEVANT ACTION IN A GAMING ENVIRONMENT," the contents of which are hereby incorporated by reference in their entirety.

A camera projection matrix, or matrices, mapping between 2D image coordinates and 3D real world coordinates may either be derived or obtained. In some cases, the camera projection matrix may be derived or generated by identifying a number of points (e.g., 2, 4, 6, 8, etc.) in the gaming environment that have a fixed dimensional relationship with each other or a known position relative to other objects in the gaming environment (e.g., a player). These points may be correlated between a two-dimensional pixel space representation and a three-dimensional physical representation. In the example of cricket, the points may include identifying locations of the batter and bowler stumps (e.g., the tops and bottoms of each of the stumps), as these are at a known distance from one another. Using these real-world distances, a correlation or mapping between 2D pixel space of a given frame of the video can be mapped to real world coordinates in 3D. In some embodiments where the camera is stable, the camera projection may be the same for the entire video, e.g., such that a single camera projection matrix may be determined and used for multiple frames comprising a video. In other embodiments, a different camera projection matrix may be derived for each frame or a subset of frames, using several different methods described in later sections. Multiple camera projection matrices may be used in cases where the camera is moving or not perfectly stationary, such as in a handheld smartphone or other camera device, a camera mounted on another object (e.g., a helmet camera, a camera mounted on another piece of sports equipment or object tin a gaming environment, and so on). In some cases, when a camera is mostly stationary, but may move slightly during video recording, one camera a projection matrix may be used to conserve computing resources at the expense of accuracy. In other examples, multiple matrices, such as for each frame, or every other frame, every third frame, etc., may be utilized to optimize a desired balance between accuracy and resources used by the camera device/computing device (battery, storage, processing power, etc.).

Candidate two-dimensional image locations of the ball may be identified across the plurality of frames of the input video of the gaming environment using, in some examples, a neural network trained on past video inputs of the gaming environment, a camera vision algorithm, or a combination thereof. In some aspects for the cricket example, a deep neural network may be trained with thousands of example images of moving cricket balls. In some examples, this model may be run on every frame of the video for a three second period after the bowler releases the ball. The ball is detected in 2D, meaning that the position in the image in pixels is inferred, not the position in meters in the 3D world.

An optimization algorithm may be performed that uses a 3D ball physics model, the camera projection matrix, or matrices, and a subset of the candidate two-dimensional image locations of the ball to compute the parameters of an equation that estimates the three-dimensional position of the ball moving in the gaming environment by aligning the subset of the candidate two-dimensional image locations of the ball with the three-dimensional ball physics model. In some cases, the subset of candidate locations may be selected or refined using an inlier detection algorithm, such as RANSAC in conjunction with the optimization algorithm. In yet some cases, selecting the subset of the candidate two-dimensional image locations of the ball from the candidate two-dimensional image locations of the ball may include removing erroneous candidate locations of the ball. A three-dimensional track of the ball may be generated using the determined parameters in the equation that estimates the three-dimensional position of the ball moving in the gaming environment. In some aspects, the three-dimensional track of the ball and metrics of movement of the ball on the three-dimensional track may be provided to the user device, such as via a graphical representation of the track of the ball in the gaming environment with metrics overlaid onto or displayed proximate to the graphical representation of the track.

In some examples, the three-dimensional physics model includes at least three equations selected based on movement patterns of the ball in the gaming environment, where the three-dimensional physics model is selected based on a specific type of gaming environment. In the example of cricket, the at least three equations may include at least one linear function and at least one or two quadratic functions. In some cases, the three-dimensional 3D ball physics model may take into account bounce, spin, swing, and/or air resistance of the ball throughout a pitch, for example.

In some cases, generating the 3D ball track may also include applying one or more constraints to the equation, such as based on the three-dimensional physics model of the ball, where the constraints are selected based on a specific type of gaming environment. The constraints may include one or more of the following: a location in a frame of the plurality of frames of where the ball is pitched from; a sound captured by the video input that correlates to a specific action or event in the gaming environment; deviation in the horizontal or vertical direction of the ball being less than a threshold for a specific gaming environment; a speed of the ball being between a minimum speed and a maximum speed; or a position of one or more of the players in the gaming environment. These constraints may apply know or observed limitations or boundaries to characteristics of the ball and relationships between the ball and objects in the gaming environment to better refine the generated 3D ball track.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) a more robust system for tracking an object in 3D that only requires one camera; (2) faster and more efficient calculation of a 3D track of an object requiring less processing resourcing; (3) real time or near real time generation of a 3D track of an object for real time analytics and performance improvement; and (3) other advantages as will be made apparent in the rest of this disclosure. As will be appreciated by the remainder of this disclosure, the described systems and techniques provide for a widely adaptable and intuitive system for use in various gaming environments.

FIG. 1 illustrates an example diagram 100 of a device/ system 102, in a gaming environment, that can be used to capture video and generate a 3D track and/or other metrics of a ball in the gaming environment. Example diagram 100 depicts part of a cricket field 116, including bowler and batter stumps 106, 108, a player in the bowling positing 110, a batter 112 and an outline 114 of ball trajectory as it is being pitched by the bowler 110. The 3D ball trajectory 114 is shown as a black line.

As described in greater detail herein, a camera device 102 may be positioned proximate to and behind the bowler 110 to capture video of pitches made by the bowler. The video may be analyzed to generate a three-dimensional (3D) track of the ball as it is pitched from the 2D frames captured by the camera device 102. This generated 3D track may be provided to the bowler 110, coaches, trainers, and even audiences to provide for better training of the bowler 110, analysis of game play, and even top enhance the audience's experience while watching a game.

In some aspects, a stable camera, or a camera stable for at least a few seconds, may be advantageous in providing more accurate camera alignment/generating a camera projection matrix, to better map the 2D image data to 3D physical coordinates. As illustrated, in some examples, this may be accomplished by a tripod or other camera or smartphone stabilization device. The camera device 102 may be positioned anywhere proximate to the movement of the ball that is desired to be captured, and preferably with an unobstructed view of the ball through the range of movement desired to be captured. One advantage of the described systems and techniques is that perfect camera alignment or a specific position is not needed, as the camera can be calibrated at any location, whether it is stable or unstable.

An example coordinate system is also shown in the image via direction con 118. The arrows point in the positive direction for each axis. All real-world units are described herein in meters, however other measurement systems (e.g., standard), can be used to similar effect. In one example, the origin may be the center of the pitch on the ground. This point for the origin may be selected to provide symmetry for the gaming environment. The X axis may be aligned sideways or perpendicular to the direction of the throw of the ball (leg side vs offside). The Y axis may represent the vertical direction, where positive is above the ground. The Z axis may represent the direction of the throw of the ball, where positive is towards the direction of the bowler or batter. It should be appreciated that other coordinate system may be used to a similar effect.

As used herein, a video or video input is a finite set of frames (images) displayed quickly in sequence to create the illusion of continuity (or smoothness). The level of smoothness depends, largely, on the Frame Rate of the camera being used. Frame Rate is measured in frames per second (fps). The default setting on typical smartphones is usually 30 fps or 60 fps, but modern phones are also capable of higher frame rates which are used in features such as slow-motion video (usually 240 fps). In some aspects, the described models are built to run with feasible accuracy at 30 fps (which saves phone storage and battery), but they can also run at higher frame rates, which would increase the accuracy further. Furthermore, images themselves are just a grid of pixels e.g. 1280×720, each having an RGB (Red, Green, Blue) value. Therefore, a video can be represented as a list of frames, which is a 2D array of pixel values. For example, a 5 second video at 720 p and 30 fps will be a (1280×720× 3×150) sized array of numbers.

As will be described in greater detail below, using the described techniques, movement of the ball may be captured using a single camera and a 3D track of the ball generated therefrom. The 3D ball track may be provided to various users to aid in improving skills, judging competitions, and the like. In some cases, various metrics, such as speed, bounce, height, etc., can also be determined based on the 3D ball track and provided to a user to better inform the user on other attributes of the ball in motion.

It should be appreciated that a cricket gaming environment is only given by way of example, and that the described systems and techniques can be adapted and applied to various other gaming environments including baseball, football, soccer, basketball, and various other gaming environments that utilize a ball or other small moving object where analysis of the movement of such a ball or object would be useful.

Figure 2:
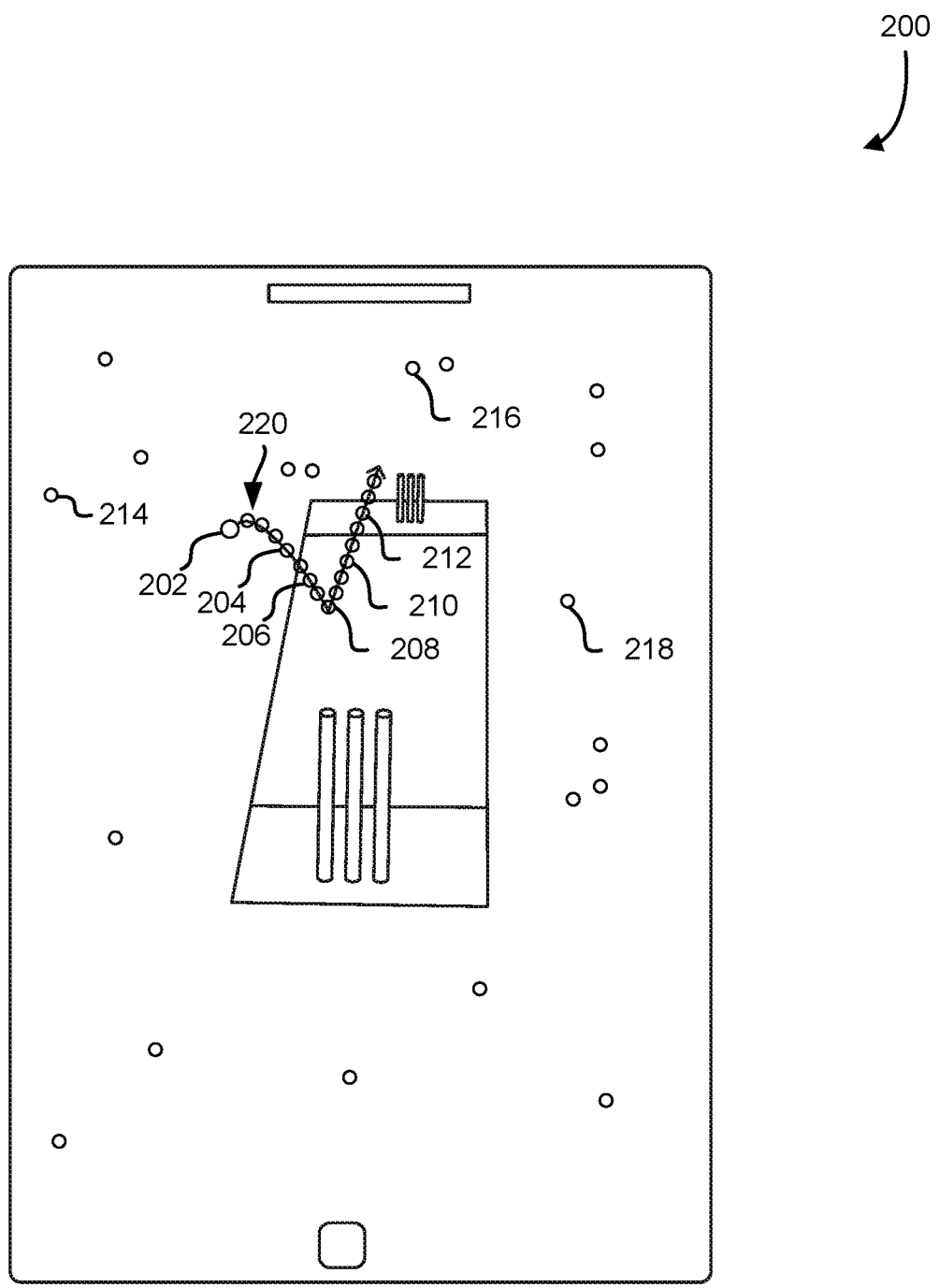
FIG. 2 illustrates an example 3D ball track or path generated by the device/system of FIG. 1, according to at least one embodiment.

FIG. 2 illustrates an example view 200 of a 3D ball track or path generated by the device/system 102 of FIG. 1. View 200 may include the combination of a number of frames of an input video, such as captured by device 102 of FIG. 1, with indications (e.g., circles) of 2D ball locations 202, 204, 206, 208, 210, 212, 214, 216, 218 etc. captured in the video over a time period. Such ball detections (e.g., provided by a neural network) may be false detections 214, 216, 218 or correct detections or detections that generally align with a track of a ball that conforms to real-world physics, 202, 204, 206, 208, 210, 212. Also illustrated in FIG. is a derived track or path of the ball 220, which tracks a number of the ball locations 202, 204, 206, 208, 210, 212. As will be described in greater detail below, various ball locations or positions may be identified through a number of frames of a video. A 3D track of the ball may then be determined by fitting the 3D curve to the ball locations, where outlier ball positions may be identified and discarded, ultimately to generate an accurate 3D track of the ball in a gaming environment.

Figure 3:
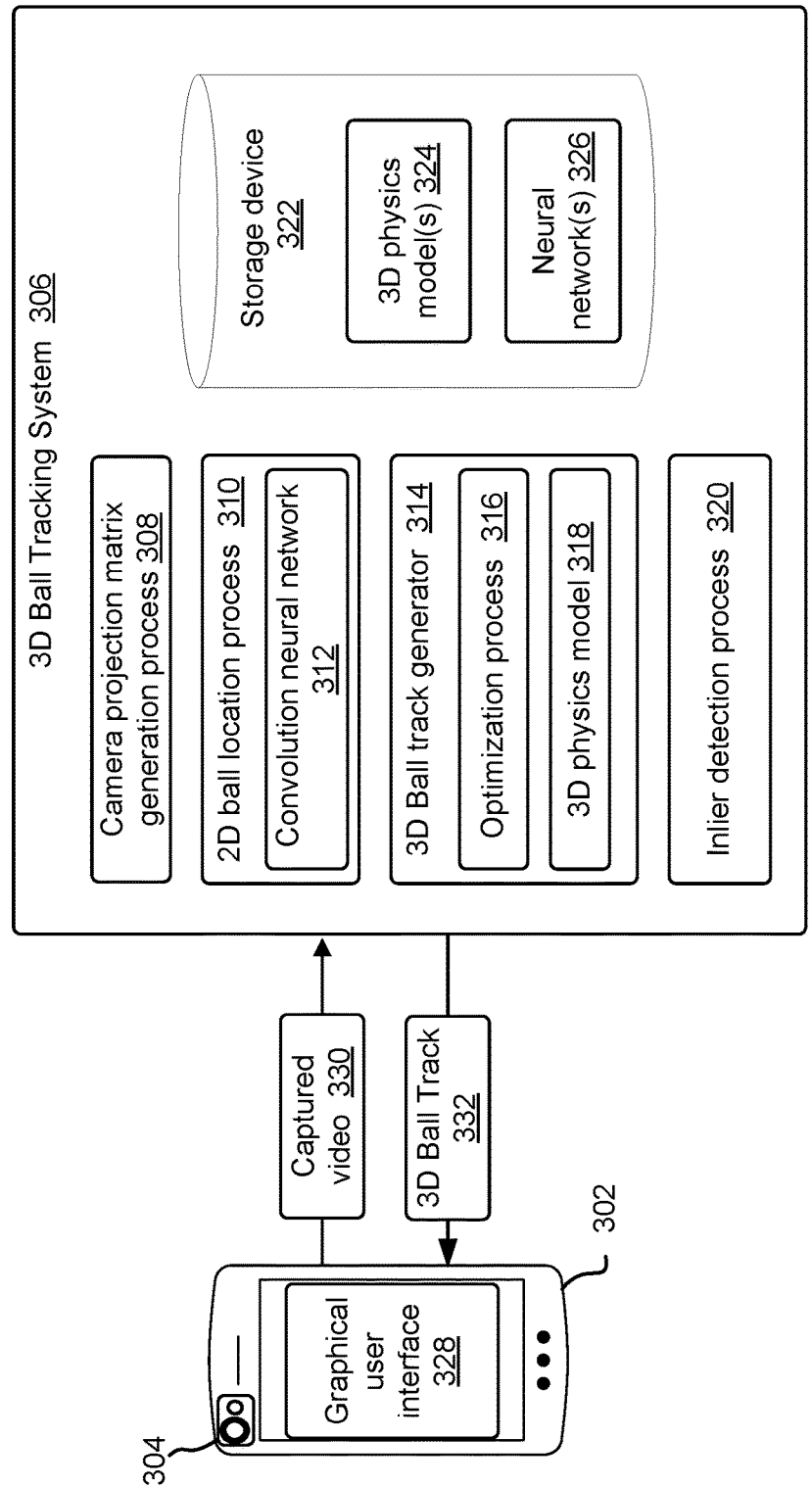
FIG. 3 illustrates an example 3D ball tracking system, according to at least one embodiment.

FIG. 3 illustrates diagram 300 of an example 3D ball tracking system 306 in communication with a user/camera device 302. As illustrated, a user device 302, such as a smartphone or other computing device (e.g., laptop, tablet, or even a desktop computing device), may include or be connected to or in communication with a camera device 304. Camera device 304 may include one or more video or image capturing devices. The user device 302 may also include a graphical user interface 328, which may display images or video captured by the camera device 304, such as when taking a video or image, and may display a generated 3D ball track from a gaming environment, including, in some cases, metrics associated with movement of the ball captured or derived from the generated 3D ball tack.

In some cases, the user device 302, such as through the camera device 304, may capture video of an action in a gaming environment, such as a pitch or throw of a ball, and may communicate that video at operation 330 to a 3D ball tracking system 306. As illustrated, the 3D ball tracking system 306 may be a collection of computing resources that can process video input and output a 3D track or movement path of a ball in an environment, such as a gaming environment, as well as metrics or other information associated with movement of the ball (or other object). In some cases, one or more components of the 3D ball tracking system 306 may include hardware resources, software resources, and/or could computing resources, or any combination thereof. In some cases, the 3D ball tracking system 306 may be provided by one or more servers that are in communication with the user device 302. In other cases, the 3D ball tracking system 306 or components thereof may be provided by one or more cloud or virtual computing resources, such as virtual machines, containers, etc., virtual databases, etc. In yet some cases, some or all of the 3D ball tracking system 306 may be provided by the user device 302, whereby zero to some of the processes performed by the 3D ball tracking system 306 may be done in conjunction with various eternal resources over one or more networks.

As illustrated, the 3D ball tracking system 306 may include a camera projection matrix generation process 308, which may also be generally referred to as camera calibration. In some cases, the camera projection matrix generation process 308 may be a process executed by the 3D ball tracking system 306 to align or map elements in a 2D captured frame or frames to a 3D real world representation of those elements.

Camera calibration is the process of localizing real world points based on the 2D content in an image. The goal is to solve for the camera parameters (location in 3D, rotation, zoom) by identifying points like the stump and pitch where their real-world location is known relative to each other or other important objects or point in a given game. In some aspects, various techniques for performing camera calibration, as are known in image process and computer vision arts, can be used on video data/frames of a gaming environment to map 2D points captured by a video camera to an accurate 3D representant of the events captured.

In some aspects, camera calibration and processes therefor, may be equivalent to finding a projection matrix which converts a 3D point in meters to a 2D point in pixels, using techniques that are known in the art. For example, assume a 3D point (0, 0, 0), which may represent the middle of the pitch on the ground:

$$x \in R^3$$

With a projection matrix C, the 3D point can be projected to a 2D image point y, i.e., (0,0), which may refer to the top left of the image, where (720, 1280) may refer to the bottom right of the image, which is provided by the following equations:

$$y = C*x = \text{Projection}(x)$$

$$C = x^{\wedge}(-1)*y$$

While this is an oversimplified explanation of determining a projection matrix, (e.g., in some aspects, the process includes more than matrix multiplication), there are a few more steps, but consider this as the projection function, which will be explained in more detail below.

The top and bottom of the stumps may be used as "keypoints". This is because there are well-defined locations for these points in meters (e.g., bottom of striker middle stump is (0, 0, −10.06) in a 3D coordinate system).

In some aspects, to detect the stumps, a U-Net convolutional neural network or other convolutional neural network may be trained to predict the top and bottom of the stumps. The-Net convolutional neural network may supplement a usual contracting network by successive layers, where pooling operations may be replaced by up-sampling operators. Hence these layers increase the resolution of the output. A successive convolutional layer can then learn to assemble a precise output based on this information. One modification in U-Net is that there are a large number of feature channels in the up-sampling part, which allow the network to propagate context information to higher resolution layers. As a consequence, the expansive path is more or less symmetric to the contracting part, and yields a u-shaped architecture. The network only uses the valid part of each convolution without any fully connected layers. To predict the pixels in the border region of the image, the missing context is extrapolated by mirroring the input image. This tiling strategy is important to apply the network to large images, since otherwise the resolution would be limited by the GPU memory.

In some cases, the exact number of data points needed to train a Computer Vision model like this varies, but 10000 data points across a diversity of settings (backgrounds, colors, lightings, etc.) is used as a rule of thumb, in some examples. In one example, where 4000+ data points have been used for training, the resultant model works out-of-the-box in settings that are not similar to ones it has been trained on. As more data is collected and annotated, the model or models may become exceedingly more robust.

In an embodiment, a system/process 328 can calibrate a camera to compute a camera projection matrix which can provide a mapping from points in the actual real-world 3D environment of the camera to 2D points on the screen of the camera/phone. By automatically identifying objects in the gaming environment which are of known sizes and distances from each other, various examples are able to compute this projection matrix. Such objects or markings may include court lines or gaming objects such as hoops, goals, bases, or wickets. The act of computing a camera projection matrix can be done in various suitable ways. For instance, in some embodiments, automatic identification of objects of previously known dimensions is not necessary. In various embodiments, a user may tap on various places on a 2D screen to manually input where certain objects are and then this input can be used to compute a projection matrix. In other embodiments, device sensors such as accelerometers may help in computing the projection matrix by providing additional information about the camera orientation. However, in some embodiments, automatic detection of one or more objects does not require manual input and the system automatically identifies where these objects are on a screen or in an image, after which the camera projection matrix can be computed. Automatic calibration can be used in some examples. Fully manual, fully automatic and hybrid calibration methods can be used in some examples.

In embodiments where the camera is handheld or not completely stable, a camera projection matrix per frame may be computed for high accuracy tracking. In one possible embodiment, this can be obtained by running the aforementioned method on each frame of the video separately to obtain a projection matrix per frame. Alternatively, this may be done on intermittent frames, called keyframes, and the camera calibrations for non-keyframes can be obtained by using optical flow from the keyframes or another similar algorithm which may use the apparent motion of the camera.

Figure 4:
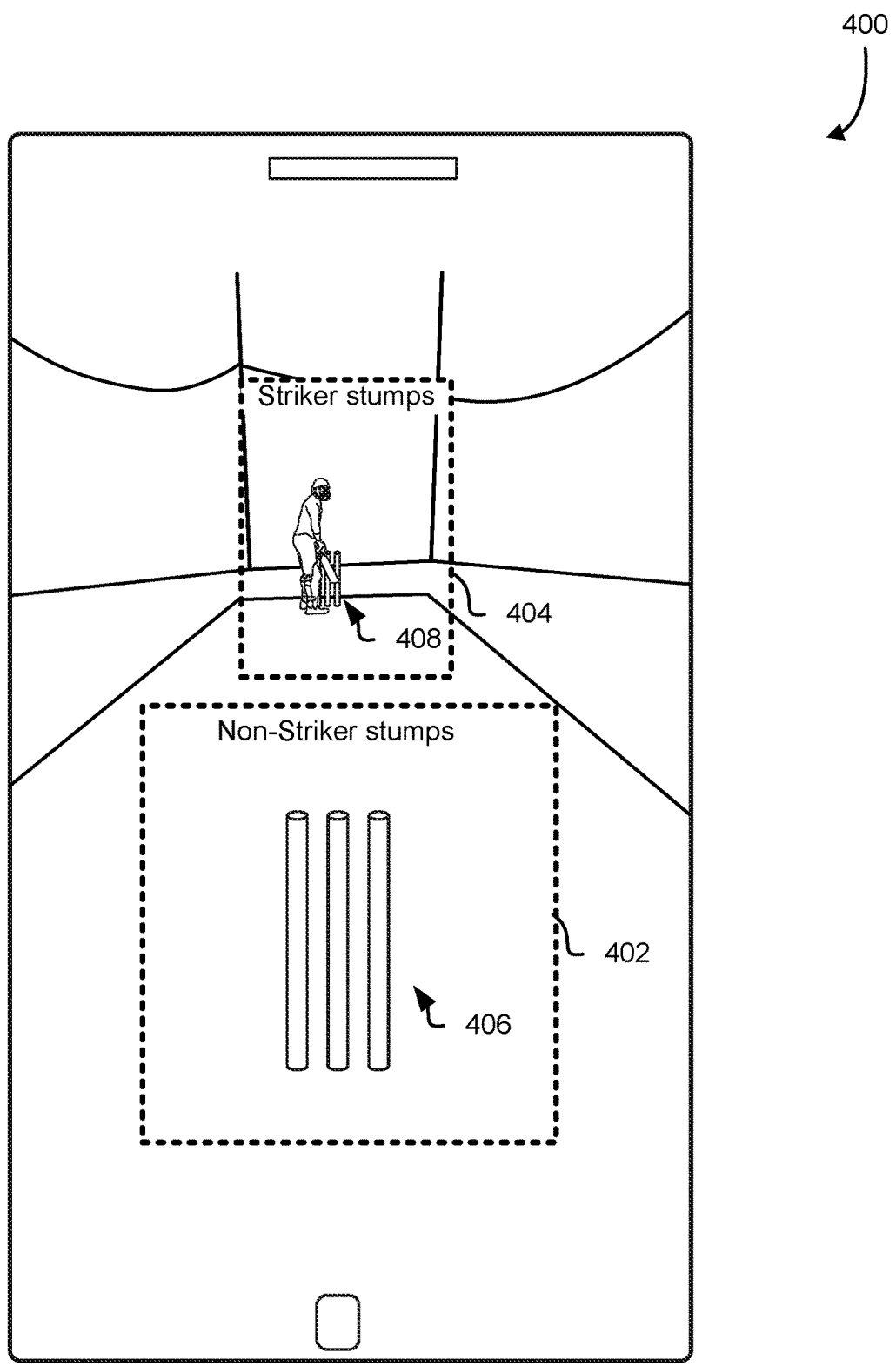
FIGS. 4-6 illustrate example steps in a process to determine a projection matrix for a view in a gaming environment, which may be performed by the device/system of FIGS. 1 and 3, according to at least one embodiment.
Figure 5:
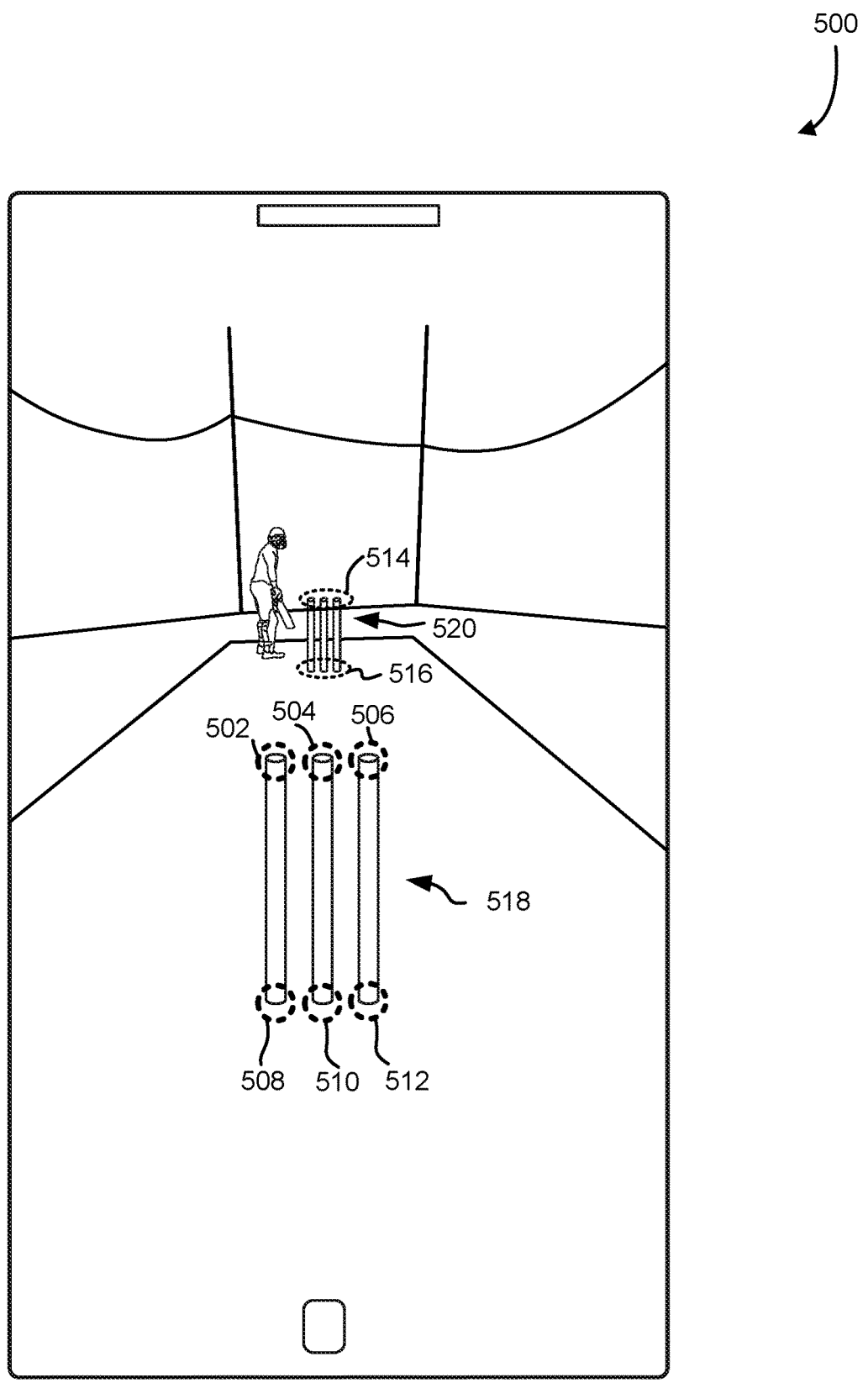
Figure 6:
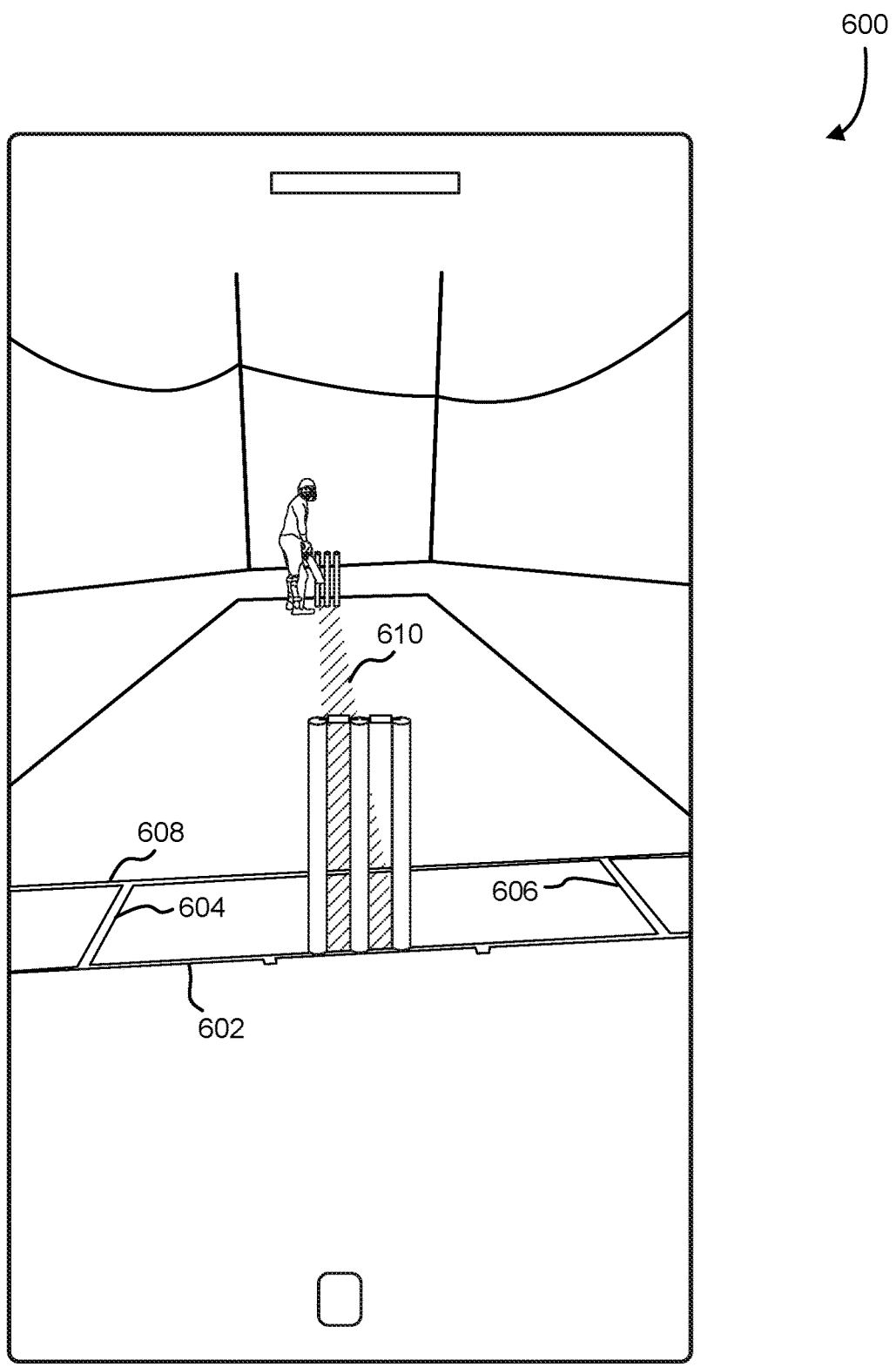

FIGS. 4-6 illustrate example steps in a process to determine a projection matrix for a view in a gaming environment, which may be performed by the device/system of FIGS. 1 and 3, and/or more specifically by the camera projection matrix generation process 308. In some cases, the example steps/views 400-600 of a camera calibration or camera projection matrix generation process may be performed in part or in response to inputs from a user of a user device, such as user device 302/102. In some optional aspects, bounding boxes or areas may be known or determined that typically contain certain features of the gaming environment, such as bounding boxes 402, 404 illustrated in view 400 of FIG. 4. These areas may be used to focus a search or analysis of the pixels within these areas to identify the stumps 406, 408 in a cricket game (or alternatively for other points in different types of gaming environments). In some aspects, these bounding boxes may be auto generated and/or input or modified by a user, such as via GUI 328 of a user device 302 used to capture video of game action. In some aspects, the bounding boxes 402, 404 may be drawn, moved, or modified in one or more dimensions by a user using a touch screen GUI. In other aspects, the bounding boxes may be auto generated by the 3D ball tracking system 306, and invisible or hidden to a user.

FIG. 5 illustrates the identification, shown by dotted circles 502-506, 508-512, and 514, 516, respectively, around the tops and bases of the bowler and batter stumps 518, 520. (only two dotted circles 514, 516 are illustrated for clarity with respect to batter stumps 520; however, it should be appreciated that in some cases, the top and bottom of each batter stump 520 may be individually identified or the top and bottoms of each of the bowler and batter stumps 518, 520 may be used to a similar effect. Via identification of the 2D locations (e.g., pixel space locations) of the tops and bottoms of the bowler and batter stumps 518, 520, the location of the stumps in the 2D image (pixel locations) and in 3D (known real world position in meters) can now be correlated. With this correlation, linear algebra may be used o find this projection matrix. For example, the system has now determined a set of 2D→3D correspondences. For example, the top of the middle stump which has 3D point (0, 0.7, −10) corresponds to image point (250, 400). For each correspondence, 3D and 2D point, $x_i \in R^3$ $y_i \in R^2$ are now known.

The system can solve for a camera matrix which minimizes the reprojection error from the 3D real world point to the detected point in 2D, represented by the following:

$$C = \text{Arg min } C \sum_i (\text{Projection}(x_i) - y_i)^2$$

This equation may be solved using, for example, the Ceres library, and/or the Levenberg-Marquardt algorithm, as are known by those having ordinary skill in the art.

In some cases, a RANSAC technique, or other equivalent technique, may be used to remove outliers (incorrect stump detections). With this projection, a virtual world may be constructed that completely aligns with the user's screen, as illustrated in view 600 of FIG. 6. In the example of view 600, court lines or other similar features 602, 604, 606, 608, 610 may be identified via the techniques described above and/or overlaid onto the image of the gaming environment to provide points of reference for a user to more clearly interpret captured game play. This generated virtual world also enables tracking the ball in 3D, as opposed to only doing tracking in 2D.

As described above, the projection matrix or model, such as generated by system/process 308, may enable identification of the 2D pixel coordinates of the stumps on the phone screen, where the position of the stumps on screen can be used to establish an understanding or mapping of the 3D world.

In some cases, a user of the described systems and techniques may perform a few simple steps to ensure a device with a camera is setup properly to capture frames/video of a ball in a gaming environment to enable the functionality described herein. First, the user may setup the camera on tripod, or any structure that enables the device to be stationary for at least 5 seconds or so. Next, the device/tripod may be moved or placed at a position such that all stumps are visible (e.g., for some length of time such as 1, 2, 3, 4, 5, 10, 15 seconds, etc.) and there is an unobstructed view of the delivery when the ball is bowled. Some examples of acceptable setups may include anywhere behind the bowler stump, either on the ground or any height above the ground, back and above the bowler stump, and various other positions that still ensure an unobstructed view of the ball as it is thrown or moves in the gaming environment.

Returning back to FIG. 3, as illustrated, the 3D ball tracking system 306 may also include a 2D ball location process or system 310. In some cases, the 2D ball location process or system 310 may be a process executed by the 3D ball tracking system 306 to identify ball locations throughout a plurality of frames of a captured video including movement of a ball or other gaming object in a gaming environment.

In various examples, any suitable number of candidate 2D image locations, including 0, may be identified for each frame of an input video. These candidates can be identified in some examples using a Convolutional Neural Network (CNN) 312 which may, for example, be trained on thousands of images where the 2D image location of the ball is labelled. This CNN may be trained on single images where the image location of the ball is labelled or, in the case of a temporal CNN in some example, on a sequence of frames (e.g., three consecutive frames or other suitable number), which allows the CNN to learn to identify a ball as it's 2D position changes across frames, while its 3D position is changing in the real world. Example CNN architectures may include the UNet or ResNet architectures. In other embodiments, an LSTM neural network may be used to detect the ball in a single frame of the video. In various embodiments, the input video may also be cropped based on the projection matrix in order to only focus on areas of the gaming environment where the ball is likely to be located, such as near the pitcher's mound or the cricket pitch. In one implementation of an embodiment for cricket, over 10,000 frames of ball data from 50 different physical locations may be collected and annotated to train the CNN.

Figure 7:
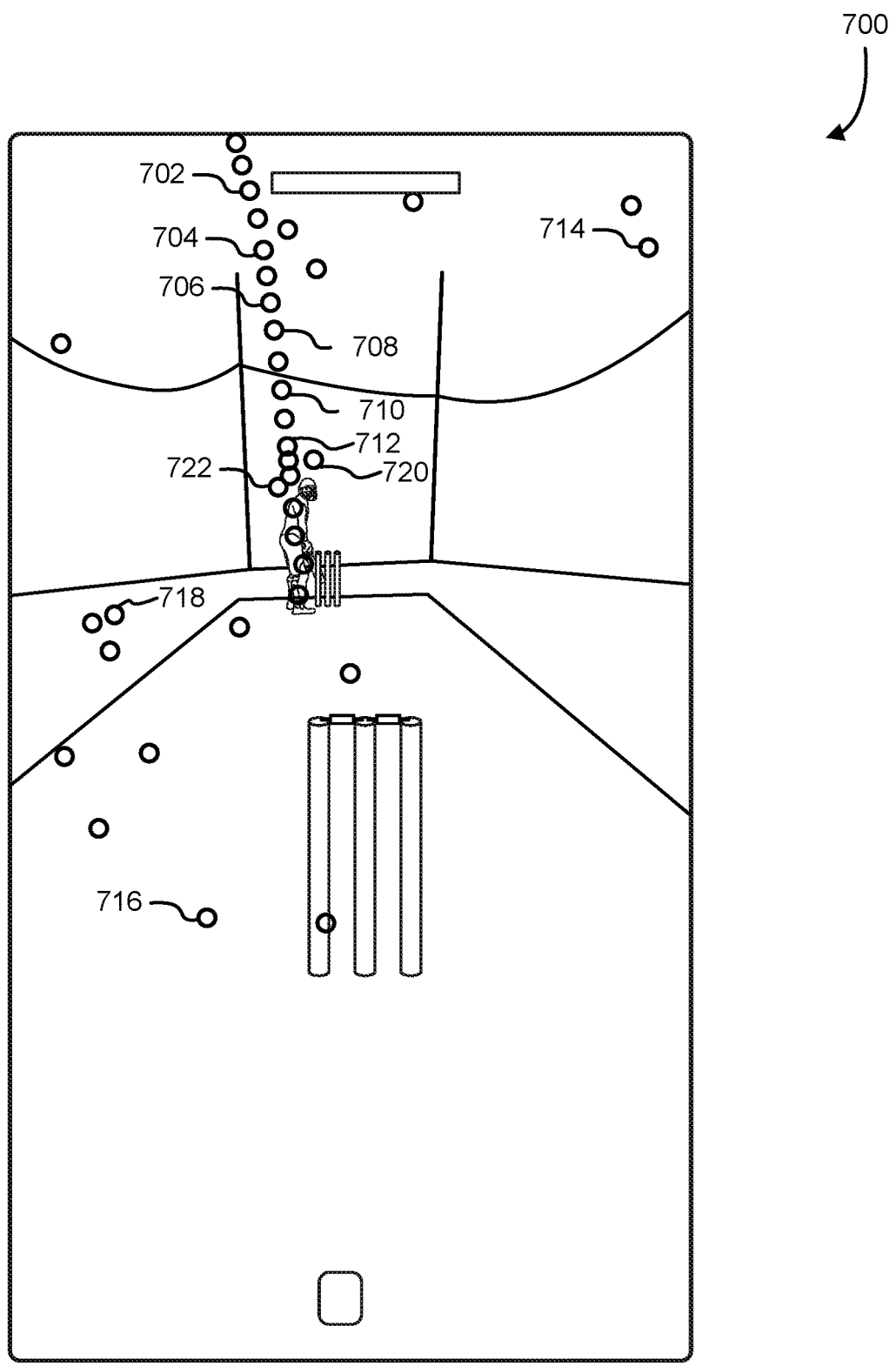
FIG. 7 illustrates an example view of captured ball positions in a gaming environment, which may be generated by the device/system of FIGS. 1 and 3, according to at least one embodiment.

FIG. 7 illustrates an example view 700 of candidate ball locations that may be detected or identified from a number of frames from a video input. As illustrated in view 700, some ball locations may clearly forma track or ball path, such as ball locations 702-712, whereas other ball locations, 714-718 may be far out of line from a ball path. In yet some cases, some ball locations, such as 720 and 722 may be close to the ball path, but may not be readily discarded as erroneous ball detections. As will be described in greater detail below, an inlier detection algorithm may be utilized to classify these ball locations 720, 722 as erroneous or not.

As also illustrated in FIG. 3, the 3D ball tracking system 306 may also include a 3D ball track or path generator system or process 312. In some cases, a 3D ball track or path generator 312 may be a system or collection of computing resources that executes an optimization process 316, as will be described in greater detail below, and uses one or more 3D physics models 318 (which be selected according to a type of gaming environment for which the system is operating in or on) a to generate a 3D track or path of a ball in video captured of a gaming environment. In some cases, the 3D ball track or path generator 312 may perform an optimization algorithm 316 that uses a 3D ball physics model and the 2D image locations of the ball to find the best fitting 3D curve of a path capturing movement of the ball in time.

In various examples, the position of the ball in a 2D image does not uniquely identify the position in 3D. This can be because the ball can be at various distances from the camera and still appear in the same 2D image location. However, when a ball is moving, the trajectory can be modeled with simple laws of physics. Various embodiments can find the best 3D curve that satisfies the laws of physics and also matches up with the observed ball locations in 2D. A 3D physics model 318, as part of the 3D ball track generator 314, of the ball's movement in the real-world can, in some examples, be defined in parametric coordinates with an equation for each dimension, by equations that may resemble the following (the x, y, and z axes are shown visually in diagram 2):

$$x_t = a_x * t + b_x,$$

where the ball position along the x axis at time t, $x_t$, is a linear function.

$$y_t = a_y * t^2 + b_y * t + c_y,$$

where the ball position along the y axis at time t, $y_t$, is a quadratic function. The gravitational constant $a_y$ is already known to us by the laws of physics.

$$z_t = a_z * t + b_z,$$

where the ball position along the z axis at time t, $z_t$, is a linear function.

The parameters to solve for in such an example can be $a_x$ ... $b_z$ which we can collectively call $\theta$. The function $p_\theta(t)$, with known $\theta$, would then output the position in 3D of the ball at time t, that can be computed using the x, y, and z formulas above. In other words, the ball track can be parametrized by $\theta$. A ball physics model can be more complex in various embodiments to account for bounce, swing (in air curve), air resistance (slowdown), and other suitable physics, environmental factors, ball characteristics, and the like. For example, the y function may be a piecewise quadratic in a sport like cricket where the ball frequently bounces during the pitch. The x function may also be a quadratic function to account for a sport like baseball where the ball's movement in the horizontal direction is not linear due to possible curve balls. For example, in one embodiment for cricket, additional parameters used for optimization can be expressed as $d_x$, $d_y$, $d_z$ which describe how the ball bounces in the x, y, and z directions respectively.

The above example formulas exemplify a simple physics model for the 3D ball track, and should not be construed as being limiting. Further physics models can be simpler or more complex in various further embodiments.

Amongst the set of 2D image locations of the ball at various times, each 2D image location can be the pixel location of the ball at time t. This can be represented in various examples as:

$$b_t \in R^2$$

where for each frame index t, we have a 2D ball detection in the image.

Given a set of 2D ball detections $b_t$, in various embodiments we can attempt to optimize for $\theta$ using the equation below:

$$\theta = \mathrm{Argmin}_\theta \Sigma_t (\mathrm{Projection}_t(p_\theta(t)) - b_t)^2$$

The above formula can find a parametric 3D ball track such that the 3D position projected onto the camera screen (e.g., using a known camera projection matrix) that aligns with the detected ball position on the camera screen at every time step. Projection$_t$ refers to the camera projection matrix associated with frame t.

Such a 3D track may not be unique, which is why some embodiments can employ heuristics about the 3D track of the ball, such as the 3D position where the ball is released from (e.g., the pitcher's mound in baseball), reasonable places it could bounce (e.g., in cricket), and reasonable speeds of the ball. Such heuristics can be formulated as hard constraints or inequalities on the parameters of $\theta$ given as $g(\theta)$. For example, minimum and maximum speeds of the pitch for baseball or cricket can result in bounds on the parameter $a_z$, which can describe the movement of the ball in the direction of the batsman. In one embodiment for cricket and baseball, a neural network is used to detect the frame and position where the ball is thrown, and this location and frame is passed as a constraint to the 3D physics trajectory.

In one possible embodiment, the optimization equation can be formulated as follows to include desired constraints and heuristics, where we assign some penalty $\lambda$ to our constraints on the trajectory $g(\theta)$ $$\theta = \mathrm{Argmin}_\theta \Sigma_t (\mathrm{Projection}(p_\theta(t)) - b_t)^2 + \lambda * g(\theta)$$

In one embodiment, computing such a nonlinear least-squares optimization can be done with the Ceres Solver library and the Levenberg-Marquardt algorithm. Other suitable algorithms and methods for computing this optimization may be used in further embodiments.

Figure 8:
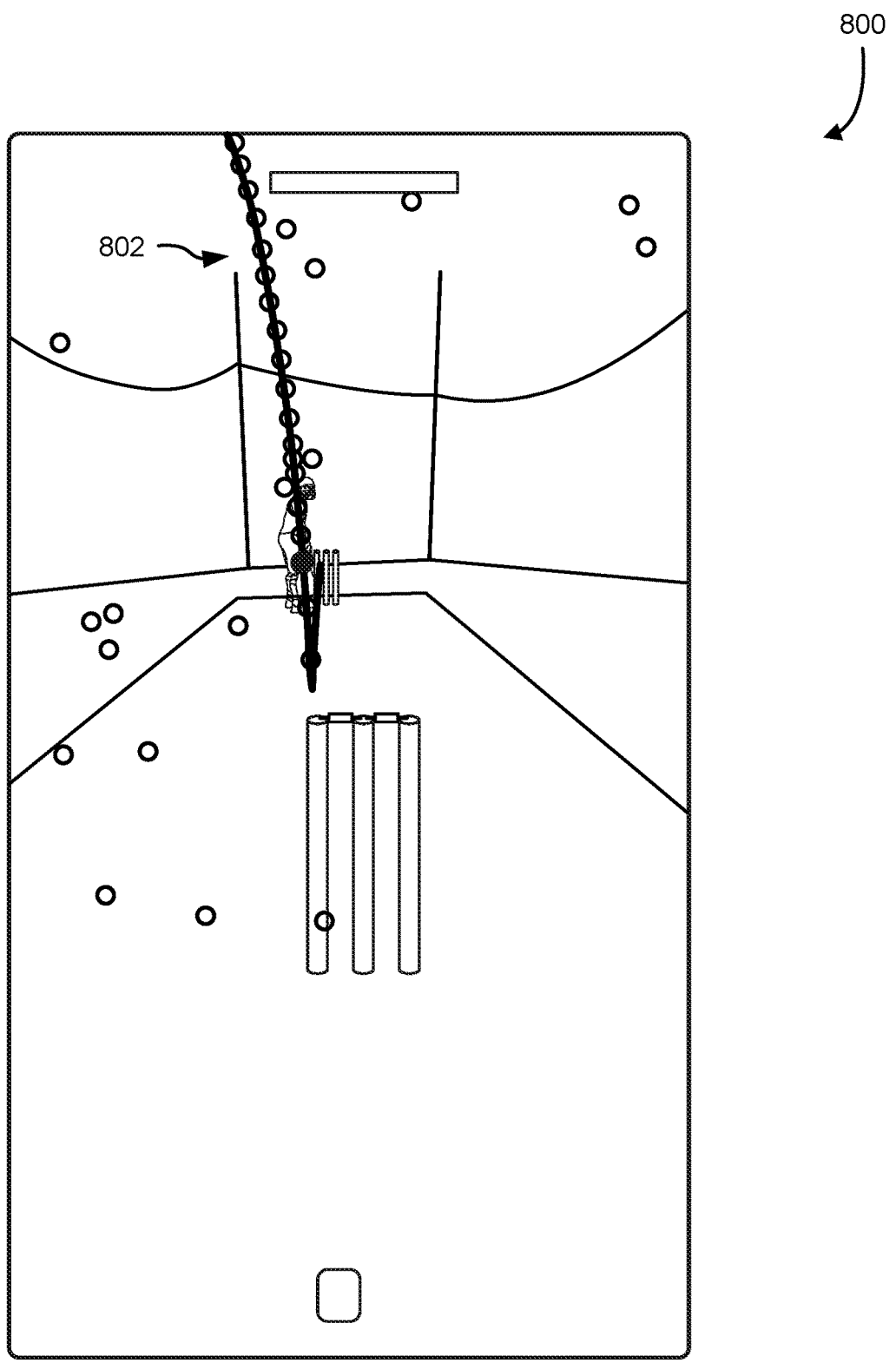
FIG. 8 illustrates an example view of a generated ball track or path based on the captured ball positions illustrated in FIG. 7, which may be generated by the device of FIG. 1, according to at least one embodiment.

FIG. 8 illustrates an example view 800 of a 3D ball track 802 mapped to a number candidate ball locations that may be detected or identified from a number of frames from a video input. As illustrated in view 800, track 802 may generally align with and map to a larger number of 3D ball locations, but may diverge from some of the ball locations due to physical constraints of movement of the ball.

As also illustrated in FIG. 3, the 3D ball tracking system 306 may also, optionally in some embodiments, include an inlier detection process 320. In some cases, inlier detection process 320 may be a process executed by the 3D ball tracking system 306 to refine which candidate 2D ball locations, such as detected and identified by the 2D ball location process 310, are used to generate a 3D track or path of a ball in video captured of a gaming environment. In some aspects, the inlier detection process 320 enables a 3D curve to be fir to 2D image data that is robust to errors of the ball location process 310. In some embodiments, inlier detection process 320 can include an application of the algorithm known as RANSAC, which can provide robustness to errors in a ball detector. Given that the ball detector may falsely identify non-ball objects as the ball, optimizing over all detections can lead to a poor 3D track that will try to fit the correct and incorrect ball detections.

For example, let us assume that the 2D ball location process 310 identifies X 2D ball location candidates across the plurality of frames. A RANSAC algorithm or similar algorithm can randomly select N subsets of size k; for each subset of k 2D ball location candidates, a line can be fitted using by the 3D ball track generator 314/optimization process 316 and the distance between the fitted line and the remaining (X-k) candidates can be calculated. Amongst the (X-k) candidates, those that are within a predefined threshold distance from the line can be identified as inliers. Subsets that contain false ball detections may generally produce a curve that does not fit the remaining (X-k) detections. The subset with the highest number inliers after fitting a curve to the subset of k detections can be selected.

In some embodiments, one or more neural networks may be used to select the best curve, instead of only choosing the curve with the most inliers, such as may be trained on annotated frames of a gaming environment. In other embodiments, the inlier detection may be a 2D tracking algorithm such as a Kalman Filter or a shortest path algorithm which first finds a candidate subset of the 2D detections before performing the 3D curve fitting optimization previously described on this subset of detections.

Returning to FIG. 3, one or more of the camera projection matrix generation process 308, the 2D ball location process 310, the 3D ball track generator 314 and/or the inlier detection process 320 may utilize data that may be locally or remotely stored and accessed from one or more storage devices or services 322. In one example, the storage device 322 may store one or more 3D physics models 324, which may be an example of 3D physics model 318, such as may be adapted or optimized for different gaming environments or different actions within different gaming environments, such as pitches in baseball, cricket, etc., a quarterback thrown in football, a swing in golf, baseball, or cricket, a kick in soccer, etc. The 3D psychics model(s) 324 may capture certain movement patterns or bounds to those movement patterns of a ball or other object in gaming environment, which may be observed or known, such as a bounce in a cricket bowl or pitch, a curve ball in baseball, off axis rotation of a football, and so on.

In yet some cases, the storage device 322 may also store and/or enable access to one or more neural networks 326, which may include one or more CNNs 312 utilized by a 2D ball location process 310, one or more neural networks utilized by the camera projection matrix generation process 308, 3D ball track generator 314, and/or the inlier detection process 320. In some cases, the 3D ball tracking system 306 may provide for an interface, such as through GUI 328 of user device 302, to enable users to rate or otherwise annotate generated 3D tracks, to enable better training of one or more neural networks 326 used by the 3D ball tracking system 306. In this way, as more users use the system 306, results may be better refined to provide more accurate tracks.

Upon generating and/or refining a 3D ball track of a ball moving in a gaming environment, the ball track may be provided to the user device 302, such as at operation 332 illustrated in FIG. 3. In some cases, the GUI 328 of the user device may format or otherwise modify the 3D ball track and display the ball track on at least one frame of the gaming environment captured by camera 304.

Figure 9:
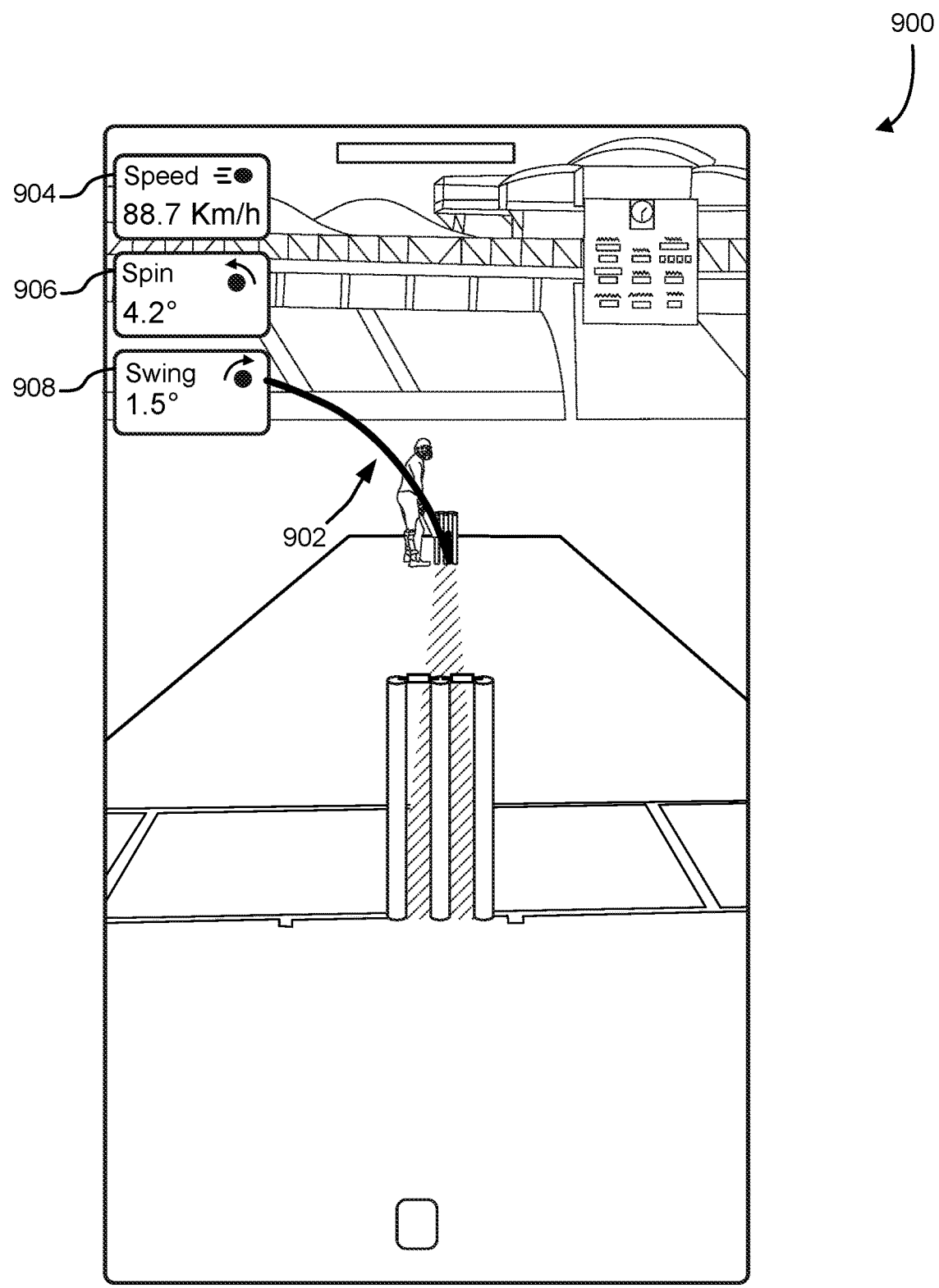
FIG. 9 illustrates an example view of a generated ball track or path including metrics of a pitch, which may be generated by the device/system of FIGS. 1 and 3, according to at least one embodiment.

In some aspects, view 800 may not be shown to a user, as it may provide some confusion as to where the track of the ball actually is and/or may not provide useful information to the user. FIG. 9 illustrates another example view 900, of a 3D generated ball track 902 without the identified ball locations, which may be displayed to a user, such as through GUI 328 of user device 302. The ball track 902 may be fully three-dimensional representation, such that in some embodiments, the GUI 328 may provide for panning or changing a viewpoint of the ball track 902, such that the ball track 902 can be viewed from 360 degrees in the horizontal plane and/or vertical plane to provide for further analysis of the movement of the ball. In some cases, distances and other information may be annotated on the screen, such as may be determined used the 3D physics model.

View 900 may additionally include one or more displays 904, 906, 908, of various metrics or attributes of a pitch of a ball, such as the cricket ball illustrated in FIG. 9. For example, a max speed of the ball may be determined form the generated 3D ball track 902 and displayed in a box or icon 904. A spin and swing of the ball may similarly be displayed at 906, 908. Other metrics may also be determined and/or displayed for the ball, such as the location of the ball at certain points in the movement (e.g., height of the pitch as certain distances in the x, y, or z direction), and the like.

Figure 10:
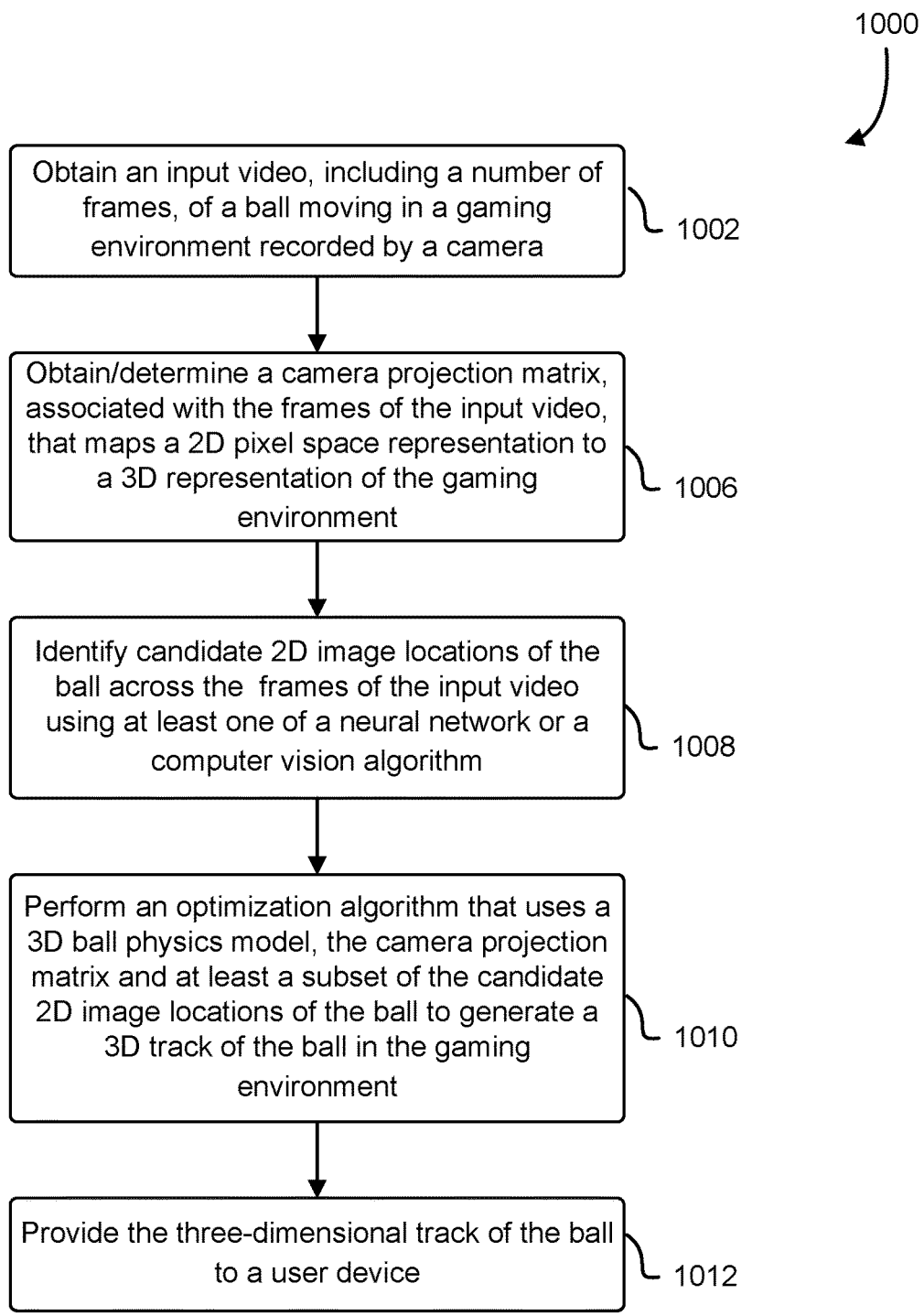
FIG. 10 illustrates an example process for generating a 3D ball track or path using a single camera, according to at least one embodiment.

FIG. 10 illustrates an example process 1000 or generating a 3D ball track or path using a camera. In some examples, process 1000 may be performed by the 3D ball tracking system 306 and/or the user device 302 described above in reference to FIG. 3. In some cases, operations of process 1000 may be performed by one or more of the camera projection matrix generation process 308, the 2D ball location process 310, the 3D ball track generator 314, and/or the inlier detection process 320, as described above in reference to FIGS. 3-9.

Process 1000 may begin at operation 1002, in which an input video of a ball moving in a gaming environment recorded may be obtained and/or recorded by a camera, such as camera 304 of user device 302, where the input video includes a plurality of frames. In some cases, the input video may be obtained by a single camera, or multiple cameras co-located on or with a single device, such as a user device. In one example, gaming environment can include a cricket gaming environment, a baseball gaming environment, a football gaming environment, a soccer gaming environment, or a basketball gaming environment.

Next, at operation 1004 a camera projection matrix, or matrices, associated with the frames of the input video and the gaming environment may be obtained. In some cases, the camera projection matrix maps or correlates a two-dimensional pixel space representation to a three-dimensional representation of the gaming environment. In some cases, the camera projection matrix may be obtained from a separate service, or may be generated as part of process 1000, such as by camera projection matrix generation process 308 described in greater detail above in reference to FIG. 3. In some cases, such as when the camera is stationary, one camera projection matrix may be sued for a number of frames or all frames of a video. In other cases, such as when the camera is not stationary, multiple matrices may be obtained or determined, such as for every frame (e.g., when the camera is moving a lot or when accuracy is important), or for a subset of frames or key frames (frames selected to represent the video, such that may be selected to correspond to every other, every $3^{rd}$, every 5 frame and so on). In some cases, a plurality of camera projection matrices may be obtained or generated, wherein individual camera projection matrices of the plurality of camera projection matrices are associated with individual key frames of the plurality of frames of the input video and the gaming environment, wherein generating an individual camera projection matrix comprises identifying at least two points in an individual key frame that have a fixed dimensional relationship with each other and correlating the at least two points between a two-dimensional pixel space representation and a three-dimensional physical representation.

At operation 1006 candidate two-dimensional image locations of the ball may be identified or detected across the plurality of frames of the input video of the gaming environment using at least one of a neural network or a computer vision algorithm. In some cases, operation 1006 may be performed by the 2D ball location process 310 described in greater detail above in reference to FIG. 3.

At operation 1008 an optimization algorithm may be performed, that uses a 3D ball physics model, the camera projection matrix or matrices and at least a subset of the candidate two-dimensional image locations of the ball to generate a three-dimensional track of the ball in the gaming environment that incorporates at least the subset of the candidate two-dimensional image locations of the ball to satisfy the 3D physicals model. In some cases, operation 1006 may be performed by the 3D ball track generator 314 described in greater detail above in reference to FIG. 3. In some cases, a subset of the candidate two-dimensional image locations of the ball may be selected from the candidate two-dimensional image locations of the ball by removing erroneous candidate locations of the ball. In some cases, the 3D physics model includes at least two equations selected based on movement patterns of the ball in the gaming environment.

At operation 1010, the three-dimensional track of the ball may be provided to a user device such as including a graphical representation of the three-dimensional track of the ball to a GUI 328 of a user device 302. In some examples, process 1000 may also include generating metrics of movement of the ball based on the three-dimensional track of the ball; and providing the metrics overlaid onto a representation of the three-dimensional track of the ball in the gaming environment to graphical user interface of the user device.

In some examples, process 1000 may additionally include applying one or more constraints, based on the three-dimensional physics model of the ball, to generate the three-dimensional track of the ball in the gaming environment. The one or more constraints may include one or more of a location in a frame of the plurality of frames of where the ball is pitched from, a sound captured by the video input that correlates to a specific action or event in the gaming environment, deviation in the horizontal or vertical direction of the ball being less than a threshold for a specific gaming environment, a speed of the ball being between a minimum speed and a maximum speed or a position of one or more of the players in the gaming environment. In some cases, the three-dimensional 3D ball physics model accounts for at least one of bounce, spin, swing, or air resistance as of the ball.

In some examples process 1000 and/or other aspects of the techniques described herein may be performed for any moving object in a multitude of different environments, such as traffic accident detection and analysis, military applications, such as detecting projectiles, or other flying objects, civilian flying object analysis, such as plane travel, drone travel, and so on.

Figure 11:
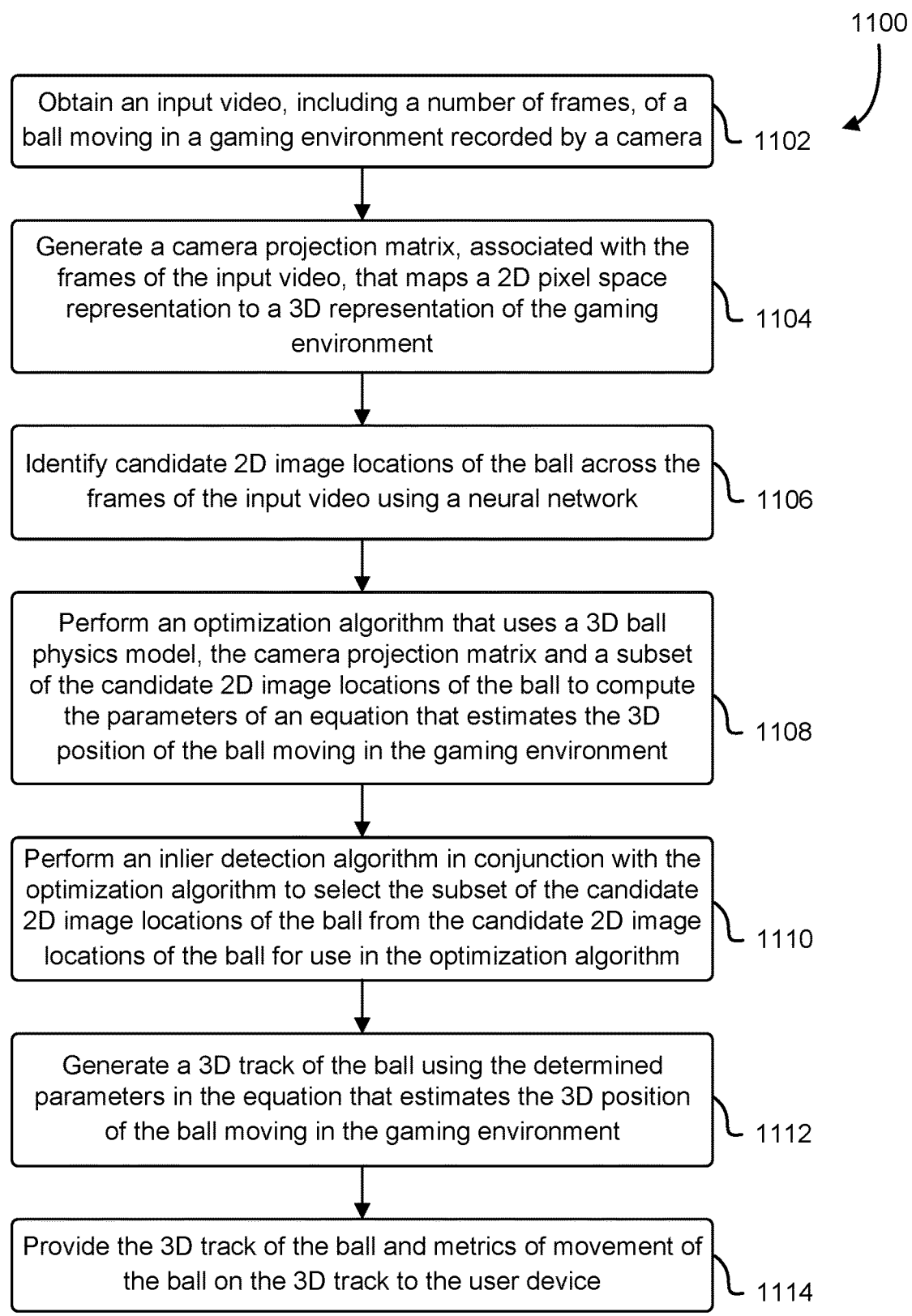
FIG. 11 illustrates an example process for generating a 3D ball track or path and associated metrics using a single camera, according to at least one embodiment.

FIG. 11 illustrates another example process 1100 for generating a 3D ball track or path and associated metrics using a single camera. In some examples, process 1100 may be performed by the 3D ball tracking system 306 and/or the user device 302 described above in reference to FIG. 3. In some cases, operations of process 1100 may be performed by one or more of the camera projection matrix generation process 308, the 2D ball location process 310, the 3D ball track generator 314, and/or the inlier detection process 320, as described above in reference to FIGS. 3-9.

Process 1100 may begin at operation 1102, in which an input video of the gaming environment recorded by a single camera of a user device may be obtained, such as camera 304 of user device 302, where the input video includes a plurality of frames of a ball being thrown.

At operation 1104, a camera projection matrix or matrices associated with the frames of the input video and the gaming environment may be generated by identifying at least two points in the gaming environment that have a fixed dimensional relationship with each other and correlating the at least two points between a two-dimensional pixel space representation and a three-dimensional physical representation. In some cases, the camera projection matrix may be generated by camera projection matrix generation process 308 described in greater detail above in reference to FIG. 3.

At operation 1106, candidate two-dimensional image locations of the ball may be identified across the plurality of frames of the input video of the gaming environment using a neural network trained on past video inputs of the gaming environment. In some cases, operation 1106 may be performed by the 2D ball location process 310 described in greater detail above in reference to FIG. 3.

At operation 1108, an optimization algorithm may be performed that uses a 3D ball physics model, the camera projection matrix, or matrices, and a subset of the candidate two-dimensional image locations of the ball to compute the parameters of an equation that estimates the three-dimensional position of the ball moving in the gaming environment by aligning the subset of the candidate two-dimensional image locations of the ball with the three-dimensional ball physics model. In some cases, operation 1108 may be performed by the 3D ball track generator 314, such as including one or more aspects of optimization process 316, described in greater detail above in reference to FIG. 3.

At operation 1110, optionally, an inlier detection algorithm may be used or applied in conjunction with the optimization algorithm to select the subset of the candidate two-dimensional image locations of the ball from the candidate two-dimensional image locations of the ball for use in the optimization algorithm. In some cases, operation 1110 may be performed by the inlier detection process 320 described in greater detail above in reference to FIG. 3. In some cases, operations 1108 and 1110 may be performed in an iterative process, such that the equation generated by operation 1108 may be refined one or more times by the inlier detection algorithm, to generate a best fit 3D curve to the 2D ball locations.

At operation 1112, a three-dimensional track of the ball may be generated using the determined parameters in the equation that estimates the three-dimensional position of the ball moving in the gaming environment. In some cases, operation 1112 may be performed by the 3D ball track generator 314 described in greater detail above in reference to FIG. 3. The three-dimensional track of the ball and metrics of movement of the ball of the three-dimensional track may then be provided to the user device.

Some embodiments can include a method for determining the 3D position of a ball moving in a gaming environment, given an input video of the gaming environment that was recorded on a single, stable camera and a camera projection matrix associated with each frame of the input video and the gaming environment, comprising: performing a Computer Vision algorithm to identify candidate 2D image locations of the ball across a plurality of frames of the input video of the gaming environment; performing an optimization algorithm that uses a 3D ball physics model, the camera projection matrix associated with each of the frames of the input video and the aforementioned set of significant 2D image locations to compute the parameters of an equation that estimates the 3D position of the ball moving in the gaming environment; performing an inlier detection algorithm, such as RANSAC or 2D tracking, in conjunction with the optimization algorithm which may identify a set of significant 2D image locations of the ball and provide a 3D ball track that may be robust to incorrect detections.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown in some embodiments can be explicitly absent from further embodiments. Accordingly, the recitation of an element being present in one example should be construed to support some embodiments where such an element is explicitly absent.

What is claimed is:

1. A method for determining a three-dimensional track of a ball moving in a gaming environment, the method comprising:

obtaining an input video of the gaming environment recorded by a single camera of a user device, the input video comprising a plurality of frames of a ball being thrown;

generating a plurality of camera projection matrices, wherein individual camera projection matrices of the plurality of camera projection matrices are associated with individual frames of the plurality of frames of the input video and the gaming environment, wherein generating an individual camera projection matrix comprises identifying at least two points in an individual frame that have a fixed dimensional relationship with each other and correlating the at least two points between a two-dimensional pixel space representation and a three-dimensional physical representation;

identifying candidate two-dimensional image locations of the ball across the plurality of frames of the input video of the gaming environment using a neural network trained on past video inputs of the gaming environment;

performing an optimization algorithm that uses a 3D ball physics model, the plurality of camera projection matrices and a subset of the candidate two-dimensional image locations of the ball to compute the parameters of an equation that estimates the three-dimensional position of the ball moving in the gaming environment by aligning the subset of the candidate two-dimensional image locations of the ball with the three-dimensional ball physics model;

performing an inlier detection algorithm in conjunction with the optimization algorithm to select the subset of the candidate two-dimensional image locations of the ball from the candidate two-dimensional image locations of the ball for use in the optimization algorithm;

generating a three-dimensional track of the ball using the determined parameters in the equation that estimates the three-dimensional position of the ball moving in the gaming environment; and providing the three-dimensional track of the ball and metrics of movement of the ball on the three-dimensional track to the user device.

2. The computer-implemented method of claim 1, wherein the three-dimensional physics model comprises at least three equations selected based on movement patterns of the ball in the gaming environment, wherein the three-dimensional physics model is selected based on a specific type of gaming environment.

3. The computer-implemented method of claim 2, wherein the gaming environment comprises a cricket gaming environment, and the at least three equations comprise at least one linear function and at least one quadratic function.

4. The computer-implemented method of claim 1, further comprising applying one or more constraints, based on the three-dimensional physics model of the ball, to the equation that estimates the three-dimensional position of the ball moving in the gaming environment, the constraints selected based on a specific type of gaming environment.

5. The computer-implemented method of claim 4, wherein the one or more constraints further comprises at least two of:

a location in a frame of the plurality of frames of where the ball is pitched from;

a sound captured by the video input that correlates to a specific action or event in the gaming environment;

deviation in the horizontal or vertical direction of the ball being less than a threshold for a specific gaming environment;

a speed of the ball being between a minimum speed and a maximum speed; and a position of one or more of the players in the gaming environment.

6. The computer-implemented method of claim 1, wherein the three-dimensional ball physics model accounts for bounce, spin, swing, and air resistance as of the ball.

7. A computer-implemented method, comprising:

obtaining an input video of a ball moving in a gaming environment recorded by a camera, the input video comprising a plurality of frames;

obtaining a camera projection matrix associated with at least one frame of the plurality of frames of the input video and the gaming environment, the camera projection matrix mapping a two-dimensional pixel space representation to a three-dimensional representation of the gaming environment;

identifying candidate two-dimensional image locations of the ball across the plurality of frames of the input video of the gaming environment using at least one of a neural network or a computer vision algorithm;

performing an optimization algorithm that uses a 3D ball physics model, the camera projection matrix and at least a subset of the candidate two-dimensional image locations of the ball to generate a three-dimensional track of the ball in the gaming environment that incorporates at least the subset of the candidate two-dimensional image locations of the ball to satisfy the 3D physics model; and providing the three-dimensional track of the ball to a user device.

8. The computer-implemented method of claim 7, further comprising:

selecting the subset of the candidate two-dimensional image locations of the ball from the candidate two-dimensional image locations of the ball by removing erroneous candidate locations of the ball.

9. The computer-implemented method of claim 7, wherein obtaining the camera projection matrix further comprises:

generating a plurality of camera projection matrices, wherein individual camera projection matrices of the plurality of camera projection matrices are associated with individual key frames of the plurality of frames of the input video and the gaming environment, wherein generating an individual camera projection matrix comprises identifying at least two points in an individual key frame that have a fixed dimensional relationship with each other and correlating the at least two points between a two-dimensional pixel space representation and a three-dimensional physical representation.

10. The computer-implemented method of claim 7, wherein the three-dimensional physics model comprises at least two equations selected based on movement patterns of the ball in the gaming environment.

11. The computer-implemented method of claim 7, wherein the gaming environment comprises a cricket gaming environment, a baseball gaming environment, a football gaming environment, a soccer gaming environment, or a basketball gaming environment.

12. The computer-implemented method of claim 7, further comprising applying one or more constraints, based on the three-dimensional physics model of the ball, to generate the three-dimensional track of the ball in the gaming environment.

13. The computer-implemented method of claim 12, wherein the one or more constraints further comprises at least one of:
- a location in a frame of the plurality of frames of where the ball is pitched from;
- a sound captured by the video input that correlates to a specific action or event in the gaming environment;
- deviation in the horizontal or vertical direction of the ball being less than a threshold for a specific gaming environment;
- a speed of the ball being between a minimum speed and a maximum speed; or
- a position of one or more of the players in the gaming environment.

14. The computer-implemented method of claim 7, wherein the input video comprises video captured at 30 frames per second.

15. The computer-implemented method of claim 7, further comprising:
- generating metrics of movement of the ball based on the three-dimensional track of the ball; and
- providing the metrics overlaid onto a representation of the three-dimensional track of the ball in the gaming environment to graphical user interface of the user device.

16. The computer-implemented method of claim 7, wherein the three-dimensional 3D ball physics model accounts for at least one of bounce, spin, swing, or air resistance as of the ball.

17. A three-dimensional ball tracking system, comprising:
- a camera;
- a display device;
- one or more processors; and
- memory in communication with the one or more processors, the camera, and the display device, that stores computer-executable instructions that, when executed, cause the one or more processors to:
  - obtain, by the camera, an input video of a ball moving in a gaming environment, the input video comprising a plurality of frames;
  - generate a camera projection matrix associated with at least a subset of frames of the plurality of frames of the input video and the gaming environment, the camera projection matrix mapping a two-dimensional pixel space representation to a three-dimensional representation of the gaming environment;
  - identify candidate two-dimensional image locations of the ball across the plurality of frames of the input video of the gaming environment using at least one of a neural network or a computer vision algorithm;
  - use a 3D ball physics model, the camera projection matrix and at least a subset of the candidate two-dimensional image locations of the ball to generate a three-dimensional track of the ball in the gaming environment that incorporates at least the subset of the candidate two-dimensional image locations of the ball to satisfy the 3D physicals model; and
  - provide a graphical representation of the three-dimensional track of the ball to the display device.

18. The three-dimensional ball tracking system of claim 17, wherein the memory stores additional computer executable instructions that, when executed, further cause the one or more processors to:
- determine metrics of movement of the ball based on the three-dimensional track of the ball; and
- provide the metrics overlaid onto the graphical representation of the three-dimensional track of the ball in the gaming environment to the display device.

19. The three-dimensional ball tracking system of claim 17, wherein the memory stores additional computer executable instructions that, when executed, further cause the one or more processors to:
- select the subset of the candidate two-dimensional image locations of the ball from the candidate two-dimensional image locations of the ball by removing erroneous candidate locations of the ball using an inlier detection algorithm.

20. The three-dimensional ball tracking system of claim 17, wherein the instructions for generating the camera projection further comprises additional computer executable instructions that, when executed, further cause the one or more processors to:
- identifying at least two points in the gaming environment that have a fixed dimensional relationship with each other and correlating the at least two points between a two-dimensional pixel space representation and the three-dimensional representation.

* * * * *